Figure 1:
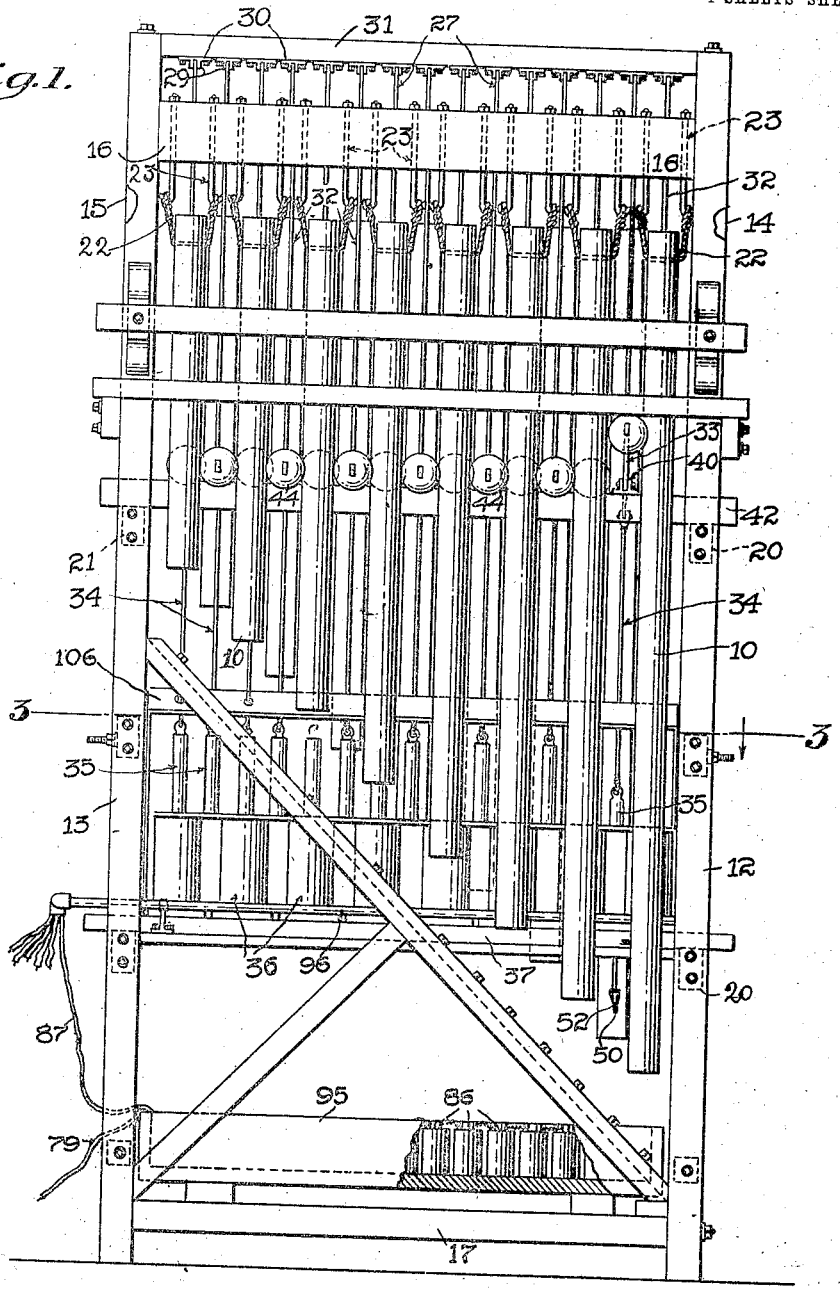

W. H. DURFEE.
BELL RINGING APPARATUS.
APPLICATION FILED APR. 22, 1911.

1,034,001.

Patented July 30, 1912.

4 SHEETS—SHEET 1.

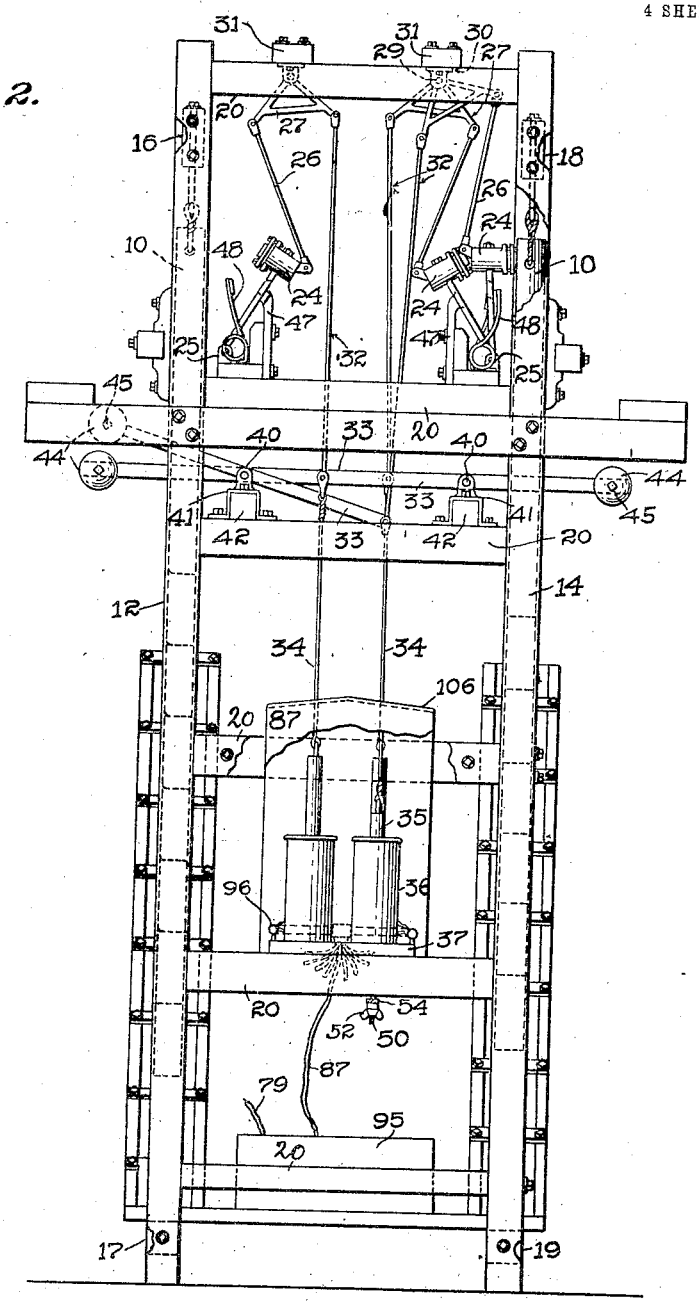

W. H. DURFEE.
BELL RINGING APPARATUS.
APPLICATION FILED APR. 22, 1911.
1,034,001.
Patented July 30, 1912.
4 SHEETS—SHEET 3.
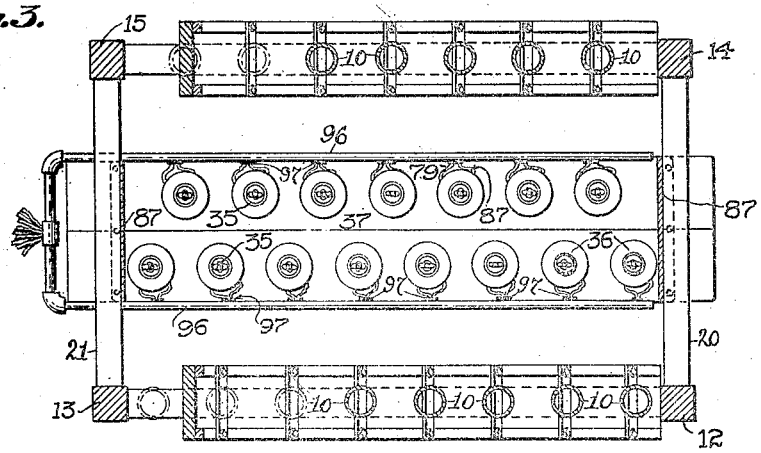
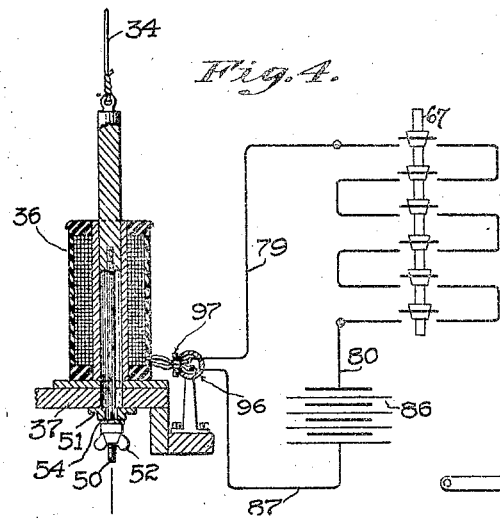
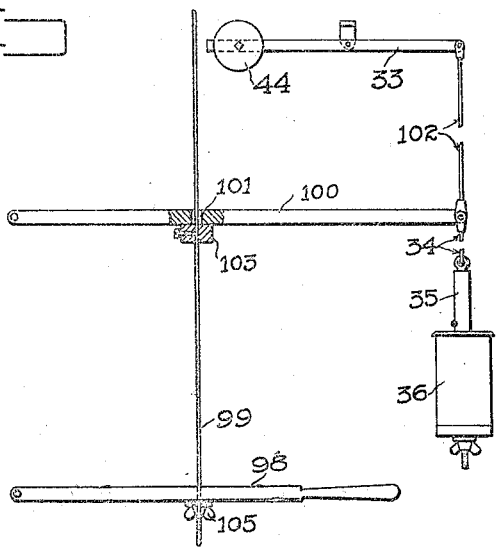
WITNESSES:
INVENTOR.
Walter H. Durfee
BY Jas. H. Churchill
ATTORNEY.

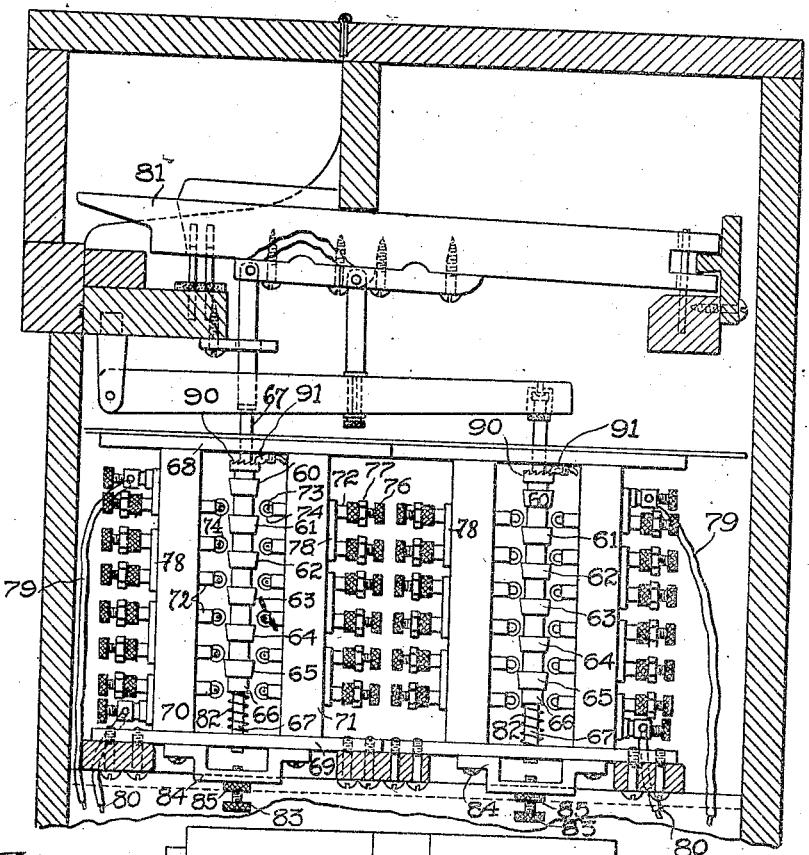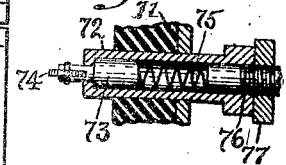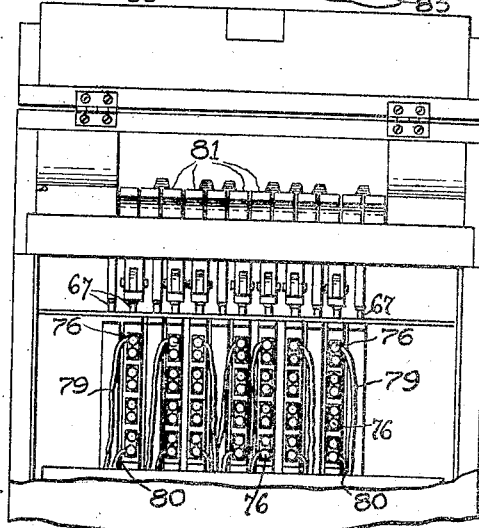

UNITED STATES PATENT OFFICE.

WALTER H. DURFEE, OF PROVIDENCE, RHODE ISLAND.

BELL-RINGING APPARATUS.

1,034,001. Specification of Letters Patent. Patented July 30, 1912.

Application filed April 22, 1911. Serial No. 622,793.

*To all whom it may concern:*

Be it known that I, WALTER H. DURFEE, a citizen of the United States, residing in Providence, county of Providence, and State of Rhode Island, have invented an Improvement in Bell-Ringing Apparatus, of which the following description, in connection with the accompanying drawings, is a specification, like letters on the drawings representing like parts.

This invention relates to musical sound producing apparatus of that character in which a series or plurality of musical tones are produced by striking upon bells.
The present invention has for its object to provide apparatus of the character described, in which provision is made for operating the same electrically, whereby the bell ringing apparatus may be located at one point, such as in the belfry of a church or in the towers of other buildings, and be operated from a distant point, such for instance, as the choir of the church or from the ground floor of the other buildings.
Provision is also made for rendering the apparatus sensitive, whereby the bells may be struck successively in short intervals of time. Provision is also made for converting hand-operated apparatus of the character described into electrically-operated apparatus at a minimum expense. Provision is further made for enabling the apparatus to be operated by currents of substantially high potential with the liability of fire reduced to a minimum. These and other features of this invention will be pointed out in the claims at the end of this specification.

Figure 1 is a side elevation of one construction of bell ringing apparatus embodying this invention. Fig. 2, an end elevation with parts broken away of the apparatus shown in Fig. 1, looking toward the left. Fig. 3, a horizontal section on the line 3—3, Fig. 1. Fig. 4, a diagrammatic view to illustrate the operation of the apparatus. Fig. 5, a modification to be referred to. Figs. 6 and 7, details of a key-board for controlling the apparatus shown in Fig. 1, and Fig. 8, a detail in section of one of the stationary contact members of the key-board to be referred to.

The invention is herein shown as embodied in an apparatus in which a series of tubular bells 10 are employed, which are suspended at their upper ends from a supporting frame. In the present instance, I have shown one construction of supporting frame, which comprises front upright corner posts 12, 13, and rear upright corner posts 14, 15, separated from one another. The corner posts 12, 13, are connected together by suitable tie bars 16, 17, and the corner posts 14, 15, are connected by like tie bars 18, 19. The corner posts 12, 14, are also connected by end cross bars 20, herein shown as six in number (see Fig. 2), and the corner posts 13 15, are connected by like cross bars 21. In the present instance, fifteen tubular bells 10 are employed, eight being arranged at what may be termed the front of the apparatus, and seven at the rear of the apparatus. Each tubular bell is suspended at its upper end by a cord or rope 22, passed through it and provided with eyes, which engage the hooked lower ends of bolts 23, secured to one of the cross bars 16. Inasmuch as the operating mechanisms for all the bells are alike in construction, a detailed description of one will suffice to enable the invention to be understood.
The operating mechanism herein shown, comprises a striker or hammer 24 (see Fig. 2) pivoted at its lower end as at 25, and connected at its upper end by a link 26 to one arm of a bell crank lever 27, which is pivoted at its center as at 29 to a bracket or lug 30, fastened to the underside of a longitudinally extended bar 31, secured to and supported by the uppermost transversely extended cross bars 20. The lever 27 has its other arm joined by a wire, rod or other substantially rigid connection 32 with a lever 33, which is connected by a wire, rod or like connection 34 with the core or armature 35 of a solenoid or electromagnet 36, resting upon a suitable support or platform 37, located between the front and rear sides of the supporting frame and resting upon end cross bars 20. The electromagnet 36 is made of sufficient size and power to operate the striker or hammer in the proper manner and cause it to strike the tubular bell 10 with which it coöperates a substantial blow. After the bell has been struck, it is highly desirable to be able to strike the bell another blow in a short time, and substantially in an instant, and the present invention has for one of its objects to effect this result. To this end, the lever 33 is employed, which extends transversely of the framework and is pivoted at 40 to a bracket or clip 41 on a longitudinally extended cross bar 42 supported at its ends by the transverse cross bars 20, said lever carrying at its free end a weight 44, which counterbalances or substantially counterbalances the weight of the core of the solenoid. The weight 44 may be adjustable on the lever and secured in its adjusted position by the set screw 45. The counterbalance for the solenoid core, enables the striker or hammer 24 to be returned substantially in an instant to its starting position, namely, against a back stop 47 (see Fig. 2), by a spring 48. Provision is also made for reducing to a minimum and substantially preventing oscillation of the lever 33 and rebound of the hammer or striker 24, and to this end, the core 35 of the solenoid has attached to it a rod 50 (see Fig. 4), which extends through the platform or support 37 for the solenoid, and preferably through a guiding disk or collar 51 secured to the underside thereof, and is provided with a stop, preferably in the form of a nut 52 on the threaded lower end of said rod. I prefer to place upon the nut 52 a washer 54 of leather, felt or other sound-deadening material to cushion the blow of the stop-nut against the guiding disk or collar 51.

In operation with the apparatus as thus far described, the strikers or hammers normally rest against their back stops 47, the levers 33 are in their horizontal position, the solenoid cores 35 are in their elevated position, and the stops 52 and their cushions 54 engage the guiding disks or collars 51. When it is desired to strike one of the tubular bells, the circuit including the solenoid for the particular bell is closed. The solenoid is energized and attracts its core, which through the connections with the bell crank lever 27 turns the latter and moves the striker or hammer forward into contact with the bell with a sharp blow. The circuit of the solenoid, is then opened, and by reason of the core 35 being balanced or substantially balanced, the striker is returned substantially in an instant to its normal or starting position against the back stop 47. On the attracted movement of the solenoid core, the lever 33 is turned on its pivot, and the counter-weight is elevated as shown in Figs. 1 and 2. When the circuit is opened, the weighted lever returns to its normal or horizontal position, and the core 35 is elevated until arrested by the stop 52. The circuit of the solenoid can then be again closed to cause the striker to again strike the bell with which it coöperates.

The apparatus as thus far described, is designed to be located in the belfry of a church or in the tower of another form of building, and the electromagnets are designed to be included in an electric circuit leading to a distant point, where it is provided with circuit controllers, one for each electromagnet or solenoid. The circuit controllers may be of any suitable construction, but I prefer to govern each electromagnet by a multiple break circuit controller, preferably of the construction shown in Figs. 6 and 7, wherein a key-board is shown provided with keys, which govern the action of the multiple break circuit controllers. Each multiple break circuit controller is provided as herein shown with a plurality of movable members, shown as six in number and numbered 60, 61, 62, 63, 64, 65, which are mounted on a carrier comprising a sleeve of insulating material 66 and a metal rod 67, guided in top and bottom bars 68, 69, which are secured to insulating bars or pieces 70, 71, carrying a plurality of sets of stationary contacts, each comprising a metal tube 72, a plunger 73 projecting from the end of the tube and carrying a wheel 74, which is adapted to engage one of the metal rings or movable contact members, a spring 75 to hold the wheel in yielding contact with the said ring, a screw 76 to adjust the pressure of the spring, and a lock nut 77 to lock said screw. The metal tubes 72 of the stationary contact members are connected by metal plates or bars 78, so as to establish a series relation between the stationary contact members when the movable contact members are in their closed position. The end plates on one of the insulating bars have connected with them the circuit wires 79, 80, which lead to the electromagnet governed by the particular circuit controller. The movable carrier for each circuit controller is moved into its closed position by a key lever 81, and is moved into its open position by a spring 82 encircling the rod 67 between the lower end of the insulating sleeve and the bottom bar 69. The closing movement of the movable carrier is limited by a set screw 83, which is adjustable in a yoke 84 secured to the bottom bar 69 and is locked in its adjusted position by a lock nut 85.

The operation of the multiple break circuit controller may be readily understood from the diagram in Fig. 4, wherein the movable contact members are conventionally shown. By reference to Fig. 4, it will be seen that when the movable carrier 67 is moved, as by the depression of a key of the key-board, the circuit of the solenoid is completed. This circuit may be traced in Fig. 4 as follows: from the positive pole of the battery 86 or other source of current, by wire 87 to the solenoid 36, through the latter, thence by wire 79 to the multiple break circuit controller, and through the latter in series back to the battery by wire 80. The multiple break circuit controller reduces to a minimum the spark between the movable and stationary members, and renders safe the use of a current of substantial voltage for operating the solenoid.

The multiple break circuit controller may be provided with means for presenting a new portion of the movable members 60 to 65 to the contact wheels 74, and for this purpose, each carrier rod 67 has fastened to it a ratchet wheel 90 with which coöperates a weighted pawl 91 pivoted to the top bar 68. When the contact carrier 67 is moved downward to close the circuit of the solenoid, the pawl descends and assumes a more vertical position, whereby on the return movement of the contact carrier, a new tooth of the ratchet wheels engages it, and on the continued upward movement of the contact carrier, the pawl causes the ratchet wheel and the contact carrier to rotate, thereby bringing a fresh portion of the movable contact members into line with the wheels 74 of the stationary contact members. As a result of this construction, the faces of the contact members are maintained in their most effective condition for obtaining good electrical connection.

In Figs. 1 and 2, the source of current for the solenoids is shown as a comparatively large number of battery cells 86 located in a box 95 supported by the framework below the solenoids, but it will be understood that it is not desired to limit the invention to this particular source of current. Provision is also made to further safeguard the apparatus and the building in which it is located from fire, and for this purpose, the wires leading to and from the solenoids are run through metal tubes or pipes 96 extended on opposite sides of the framework parallel with the solenoids, and provided with suitable outlets 97 near the solenoids.

I may prefer to employ the key-board herein shown, but it is not desired to limit the invention in this respect.

In many instances, it may be desirable to electrically operate bell ringing apparatus which is also operated by hand, and this result may be accomplished as shown in Fig. 5, wherein 98 represents the hand-operated lever, which is connected by the cord or other connection 99 with the striker of the bell. To enable the striker to be operated electrically without disturbing the hand-operated mechanism, and yet obtain the quick action of the apparatus shown in Fig. 1, the core 35 of the electromagnet 36 is joined by the connection 34 with the free end of a lever 100 pivoted at its other end, and provided with a hole 101 through which the striker connection 99 is passed. The free end of the lever 100 is joined by the connection 102 with the counter-balanced lever 33, and the striker connection 99 is provided with a collar or stop 103 on it below the lever 100. By reference to Fig. 5, it will be observed, that, when the hand lever 98 is used to pull down the cord or connection 99, the latter passes freely through the lever 100 and the striker is operated by hand. When however, the solenoid is energized, the lever 100 is moved, and by means of the collar 103 pulls the cord 99 down, thus operating the striker. At the same time, the counter-balanced lever 33 is moved in the manner above described with reference to Fig. 1. When the solenoid is deënergized, the counter-balance 44 restores the core 35 to its starting position and lifts the lever 100, thereby allowing the striker to return to its normal or starting position. It will thus be seen, that the hand-operated bell ringing mechanism now in use can be readily converted into an electrically operated mechanism at a minimum expense. In Fig. 5, the connection 99 is practically joined to the lever 98 by the nut 105 bearing against the underside of the said lever. The solenoids 36 may be protected from the weather by a hood 106 having suitable openings through which the wires 34 are passed.

I have herein shown one construction of apparatus in which the bells are shown as tubular in form, but it is not desired to limit the invention in this respect. Furthermore, it is not desired to limit the invention to the particular construction of apparatus herein shown.

Claims:

1. In an apparatus of the character described, in combination, a framework, a plurality of tubular bells suspended from said framework, a plurality of strikers coöperating with said bells, solenoids having cores connected with said strikers to operate the same to strike said bells, means to move said strikers away from said bells, counterbalancing levers for said cores connected therewith to be moved thereby in one direction when the solenoids are energized, stops to limit the movement of the cores when the solenoids are deënergized, and circuit controllers for said solenoids, substantially as described.

2. In an apparatus of the character described, in combination, a framework, a plurality of bells supported by said framework, a plurality of strikers coöperating with said bells, solenoids having cores connected with said strikers to operate the same to strike said bells, springs to move said strikers away from said bells, counterbalancing levers for said cores connected therewith to be moved thereby, and circuit controllers electrically connected with and governing the action of said solenoids, substantially as described.

3. In an apparatus of the character described, in combination, a plurality of bells, a plurality of strikers coöperating therewith, a plurality of solenoids located below said strikers, cores for said solenoids, connections between said cores and said strikers to enable the cores to move the strikers into contact with the bells when the said cores are attracted by their solenoids, and substantially horizontal levers located between said strikers and said cores and connected with said cores, and counterweights for said cores carried by said levers to enable the cores to be quickly elevated and the strikers to be operated at short intervals of time, substantially as described.

4. In an apparatus of the character described, in combination, a plurality of bells, a plurality of strikers coöperating therewith, a plurality of solenoids located below said strikers, cores for said solenoids, connections between said cores and said strikers to enable the cores to move the strikers into contact with the bells when the said cores are attracted by their solenoids, substantially horizontal levers located between said strikers and said cores and connected with said cores, counterweights for said cores carried by said levers to enable the cores to be quickly elevated and the strikers to be operated at short intervals of time, and stops for said cores to limit the movement of the latter under the influence of said counterweighted levers, substantially as described.

In testimony whereof, I have signed my name to this specification in the presence of two subscribing witnesses.

WALTER H. DURFEE.

Witnesses:
 JAS. H. CHURCHILL,
 J. MURPHY.